United States Patent [19]

Stönner et al.

[11] 3,868,335
[45] Feb. 25, 1975

[54] SETTLER FOR LIQUID-LIQUID EXTRACTORS

[75] Inventors: Hans-Martin Stönner, Frankfurt/Main; Ulrich Von Knoppe, Neu-Isenburg; Paul Weisner; Erhard Kraus, both of Obering; Fritz Zigelsky, Mulheim, all of Germany

[73] Assignee: Metallgesellschaft AG, Frankfurt am Main, Germany

[22] Filed: Feb. 27, 1974

[21] Appl. No.: 446,451

Related U.S. Application Data

[63] Continuation of Ser. No. 314,041, Dec. 11, 1972, abandoned, which is a continuation of Ser. No. 108,860, April 25, 1970, abandoned.

[30] Foreign Application Priority Data

Apr. 25, 1970 Germany............................ 2020305

[52] U.S. Cl. ............................ 210/522, 23/267 MS
[51] Int. Cl............................................... B01d 11/04
[58] Field of Search.......... 23/267 MS; 210/84, 322, 210/521, 522

[56] References Cited
UNITED STATES PATENTS

| | | | |
|---|---|---|---|
| 1,176,775 | 3/1916 | Morris | 210/521 |
| 2,134,203 | 10/1938 | Raymond | 210/521 |
| 2,347,810 | 5/1944 | Brandt | 210/521 |
| 2,375,590 | 5/1945 | Schonberg | 210/521 |
| 2,497,392 | 2/1950 | Breukel | 210/521 |
| 2,728,714 | 12/1955 | Winkler | 23/267 MS |

*Primary Examiner*—Charles N. Hart
*Assistant Examiner*—F. F. Calvetti
*Attorney, Agent, or Firm*—Burgess, Dinklage & Sprung

[57] ABSTRACT

A phase separator for liquid-liquid extractors of the mixer settler-type which includes an inlet for a mixture of phases, outlets for the pure phases which have been separated as provided with internal means to promote the separation of phases which includes a plurality of substantially horizontally extending, flat boxes, which are disposed one over the other and open at least at one major surface and having at least one outlet opening at the edge of the closed major surface, and an inlet for the phase mixture to be separated adjacent to each box.

9 Claims, 12 Drawing Figures

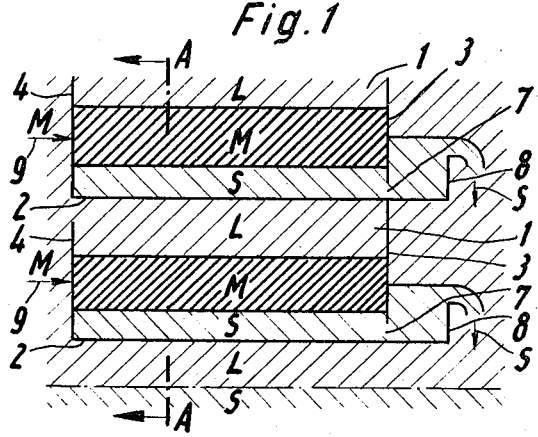
Fig.1
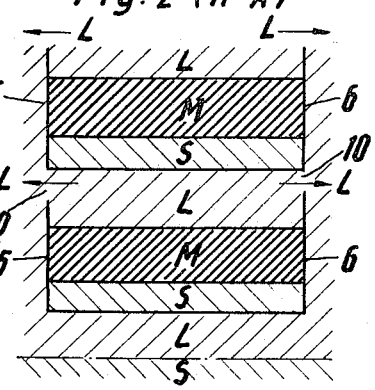
Fig.2 (A-A)
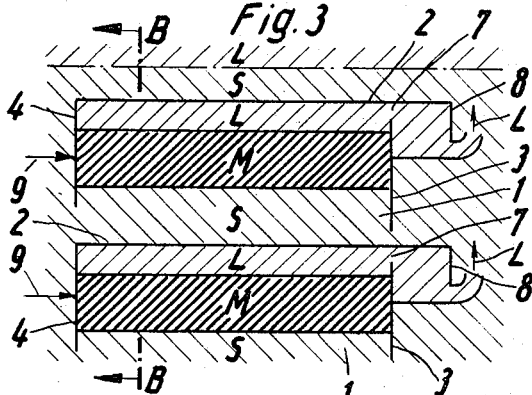
Fig.3
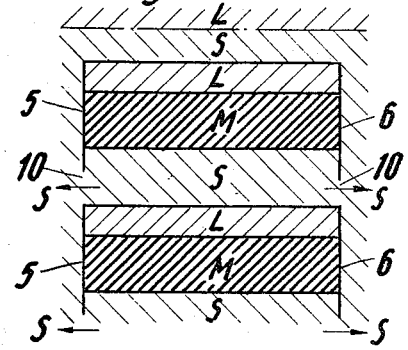
Fig.4 (B-B)
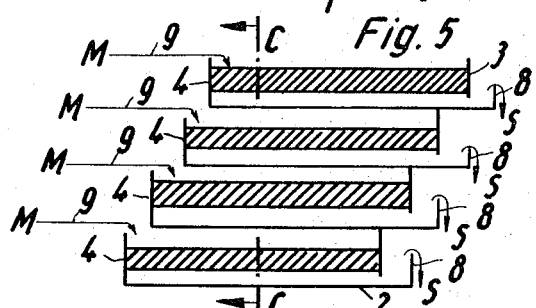
Fig.5
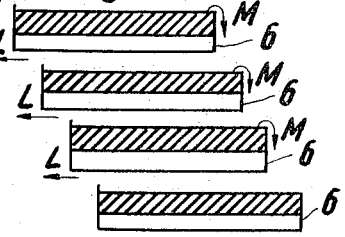
Fig.6
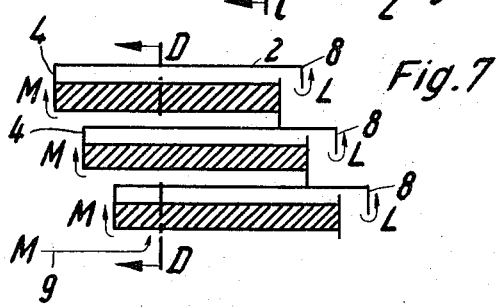
Fig.7
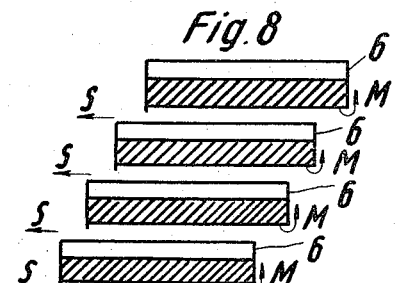
Fig.8

SETTLER FOR LIQUID-LIQUID EXTRACTORS

This is a continuation, of application Ser. No. 314,041, now abandoned, filed Dec. 11, 1972 which is in turn a continuation of Ser. No. 108,860, now abandoned filed Apr. 25, 1970.

BACKGROUND

Apparatus for separating liquid mixtures by an extraction with a suitable solvent are preferably multistage counterflow systems in which each stage consists of a mixing zone and a separating zone and are referred to in industry as mixer and settler, respectively.

In the mixing zone, the liquid mixture and the extracting solvent, which is not miscible or miscible only to a limited extent with the mixture, are intimately mixed, in most cases by means of mechanical energy. The resulting mixture is separated as perfectly as possible into the pure phases in the separating zone. In multi-stage counterflow systems, the extract phase which is progressively enriched with soluble matter, and the residual phase, which is progressively empoverished in soluble matter, are contacted with each other several times. Residue which is free of soluble matter is removed at the end where the pure solvent is supplied, and the liquid mixture to be separated is introduced a few stages before the end where the enriched extract phase is withdrawn.

The mixing of liquid mixture to be extracted and solvent, or of the extract and residual phases can be accelerated and intensified by a supply of mechanical energy at a suitable rate.

The separation of the extract and residual phases in the settlers depends essentially on the difference between the densities of the two phases. This separation is the slowest step throughout the extraction process and determines the throughput of the plants.

A measure of the effectiveness of a settler is the maximum separating load, which is defined as the maximum throughput of phase mixture which can be obtained per hour and per square meter of the bottom surface area of the separator.

When a mixture of phases permits only a low maximum separating load, e.g., because the densities of the two phases differ only slightly, the botton surface area of the settler must be so large that the settler and the entire plant has a large space requirement. This space requirement increases with the throughput rate required for the extraction plant.

It is known to accelerate the separation of phases in a separator by the incorporation of plane, corrugated or serrated, horizontal or inclined plates in the empty settling space (German Pat. No. 658,300 and German application No. 1,243,645). For the same purpose, the settling space may be packed with sharp-edged bodies. Finally, it is known to accelerate the separation of phases in separators by an application of electric fields (German application No. 1,519,830).

When it is desired to separate a small dispersed phase from a much larger continuous phase, internal installations consisting of parallel horizontal plates have proved highly satisfactory, e.g., in the drying of mineral oils by a separation of finely dispersed droplets of water as a coherent phase, or, in the inverse case, in the separation of fine droplets of oil from waste water. In these cases, the ratio of the continuous phase to the dispersed phase is between 100:1 up to above 1,000:1.

Such plate installations are known to have a lower effectiveness with smaller phase ratios of about 20:1 to 1:1, such as are enncountered in extraction processes.

The mixture of phases supplied to an empty settler forms an intermediate layer, from which an upper layer consisting of pure light phase and a lower layer consisting of a pure heavy phase are separated. All three layers extend throughout the settling cross-section. Only those plates which are disposed in the intermediate layer can promote the phase separation between horizontal plates whereas the plates disposed in the pure phases are ineffective. The effectiveness of the plates in the phase mixture is further reduced if the mixture of phases can spread laterally outside of the plates. If the plates at the inlet end of the separator extend throughout the cross-section of the container, the settler must comprise a free space which succeeds the plates wherein the mixture can separate to form the two pure phases. The bottom surface area of the settler cannot be reduced in this manner.

It has been found that the separation of phases in the settlers of extraction plants can be much accelerated if the internal installations are designed so that the mixture of phases is divided into a multiplicity of layers, from which the light and/or the heavy phases can separate and flow to the respective collecting spaces.

Such suitable installations consist of flat boxes, which are arranged one over the other in the settling space and which are supplied with a mixture of phases and from which the pure phases which have been separated can be discharged over overflow weirs and/or underflow pipes.

SUMMARY

The invention relates to a phase separator for liquid-liquid extractors of the settler type or class which comprises an inlet for a mixture of phases, outlets for the pure phases which have been separated, and internal means to promote the separation of phases which include a plurality of substantially horizontally extending, flat boxes disposed one over the other and open at least at one major surface and having at least one outlet opening at the edge of the closed major surface, an inlet for the phase mixture to be separated adjacent (connected) to each box.

THE DRAWINGS

In FIGS. 1 to 12, corresponding parts are provided with the same reference characters.

FIG. 1 is a vertical sectional view on a plane extending in the direction of flow of the mixture of phases through two open-topped tublike boxes, which are disposed one over the other.

FIG. 2 is a vertical sectional view taken on line A—A in FIG. 1.

FIG. 3 is a vertical sectional view taken on a plane which extends in the direction of flow of the mixture of phases to be separated through two open-bottomed, hoodlilke boxes which are disposed one over the other.

FIG. 4 is a vertical sectional view taken on line B—B in FIG. 3.

FIG. 5 is a vertical sectional view on a plane extending through four tublike boxes, which are arranged one over the other and relatively offset in both horizontal directions, as viewed in the direction from the inlet for the mixture of phases to the outlet for the heavy phase.

FIG. 6 is a vertical sectional view taken on line C—C in FIG. 5.

FIG. 7 is a vertical sectional view taken on a plane which extends through three hoodlike boxes which are arranged one over the other and are relatively offset in the two horizontal directions, as viewed in the direction from the inlet for the phase mixture to the outlet for the light phase.

FIG. 8 is a vertical sectional view of apparatus similar to that of FIG. 7.

DESCRIPTION

Figure 9:
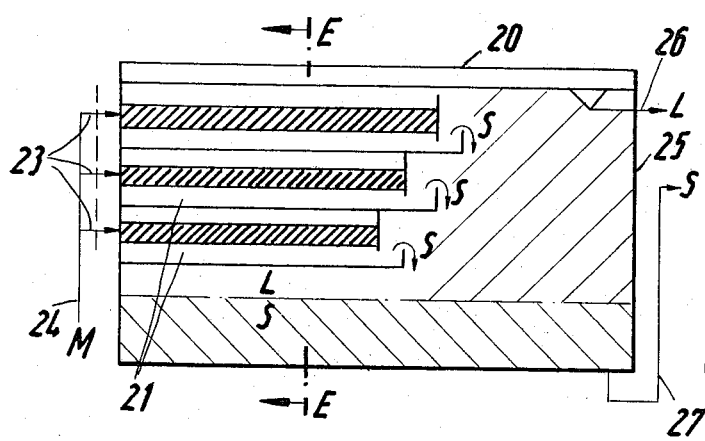
FIG. 9 is a vertical sectional view showing a settler which is provided with installations according to the invention.

The outlet openings at the boxes are preferably weirs. These boxes are preferably rectangular and may have equal or different basis areas. They may be arranged one over the other directly or offset. The mixture of phases to be separated is supplied to each box through a separate inlet. The pure phases which have been separated are discharged from each box.

The boxlike installations may be arranged in the settler in the zone for the light phase and in the zone for the heavy phase in one group or in a plurality of groups, above and below the interface level which is determined by the outlet for the pure heavy phase. The tub-shaped, open-topped boxes are used only in the zone for the light phase and the hood-shaped, open-bottomed boxes are used only in the zone for the heavy phase.

The boxes consisting of open-topped tubs or open-bottomed hoods may be relatively staggered horizontally in one direction or in two directions so that at least one side of a box extends over or under the open major surface of an adjacent box. That side is lower than the other sides or is provided with indentations (e.g., incisions) at its free edge so that phase mixture can flow over at said edge. Where the boxes are thus arranged in cascade, the phase mixture to be separated is preferably charged in a surplus to the uppermost or lowermost boxes so that part of the mixture is discharged to the adjacent box and the succeeding boxes whereas a pure phase which has been separated flows from each box over the underflow or overflow weir; this pure phase is the light phase flowing from the open-bottomed hoods and the heavy phase flowing from the open-topped tubs. In this embodiment, the mixture of phases to be separated may be supplied also to several boxes of a cascade and this supply may be effected, if desired, in addition to the main supply to the uppermost or lowermost boxes. In this way, the load per surface area of each box can be changed and matched.

The boxes extend substantially horizontally in the housing of the phase separator so that the closed major surface of each box consists of the bottom of the open-topped tub or the top of the open-bottomed hood. It may be of advantage to arrange the boxes with a slight inclination in one direction or in two directions.

Owing to the inclination of a box in the direction of flow or the mixture of phases to the discharge weir for the pure phase, the latter builds up before the weir to a height which is larger than corresponds to the thickness of the layer of said phase in the horizontally extending box.

As a result of the inclination of a box transversely to the direction of flow of the mixture of phases, the edge of that side of the box which lies over the open major surface of the following box is on a lower level (with tub-shaped boxes) or on a higher level (with hood-shaped boxes) than the other edges so that said edge is an overflow or underflow edge. The inclination which is suitable in both cases will generally not exceed an angle of 15° so that the boxes still extend substantially horizontally.

Outlet openings or weirs provided at the edge of the closed major surface, on the one hand, and overflow or underflow edges at the open major surfaces, on the other hand, are suitably provided on opposite sides or preferably on adjacent sides of a box rather than on one and the same side.

The interior of the settler may be substantially filled with such boxes or groups of boxes. Comparatively small, free collecting spaces for the pure phase are left above and below the fixtures and laterally thereof. In the boxes of individual groups or in all boxes, one side wall may coincide with or be replaced by the housing wall.

The boxlike installations provided according to the invention accelerate the separation of phases so that a settler provided with these installations requires only a bottom surface area which is 20–40 percent of the basis area of a settler having an empty internal space, for a given throughput rate.

The action of a settler provided with the box-shaped fixtures according to the invention is due to the fact that the phase mixture is distributed to the boxes and is thus divided into a multiplicity of comparatively narrow layers, and droplets of pure, light and heavy phases, respectfively, have to move only short distances to reach the pure phases, and that the bottom surface area of the separator can be multiplied by means of the boxes.

Some embodiments of the internal fixtures according to the invention and of some phase separators provided with said internal fixtures are shown diagrammatically and by way of example in the drawings. In all figures of the drawing, the mixture of phases to be separated is designated M, the pure light phase is designated L and the pure heavy phase is designated S.

The boxes shown in FIGS. 1 and 2 represent a group of boxes. This group may comprise a fairly large number of boxes, up to more than 20 boxes. The boxes have an open top major surface 1, a major surface 2, which is closed by a bottom, and walls 3, 4, 5, 6. An outlet opening 7 is provided at the edge of the closed major opening, in the present embodiment at the edge with the wall 3, and opens in the overflow weir 8. An inlet line 9 for a mixture of phases is connected to the wall 4, which is opposite to the weir, and this inlet line is disposed approximately at one-half of the height of the wall 4. As the mixture of phases M introduced through the inlet line 9 flows toward the overflow weir 8, the pure phases L and S separate from said mixture. The heavy phase S is collected at the bottom up to a level on which it is discharged across the edge of the overflowweir 8 in large droplets or in filaments. The light phase L may escape through the openings 10 between the spaced apart boxes and may merge into the surrounding light phase L. The open topped tub-like boxes 1 and 2 are disposed in the settler housing above the interface which forms between the pure phases.

FIGS. 3 and 4 show open-bottomed hoodlike boxes, which are disposed in the settler housing below the interface forming between the pure phases. FIGS. 3 and 4 may be derived from FIGS. 1 and 2 in that each box is turned by half a circle about the axis passing through the sides 4 and 3, the inlet 9 and the outlet 8. For this reason, the same reference characters are used in the figures.

FIGS. 5 and 6 show a group of tublike boxes, which are relatively offset as far as the wall provided with the overflow weir and an adjacent wall is concerned. As a result, the boxes are open to such an extent on the inlet sides that the inlet lines for the mixture of phases can discharge above that open area and need not to feed through the wall.

As a result of the cascadelike staggering of the boxes, a wall which is adjacent to the overflow weir extends over the open major side of the next lower box. This wall is somewhat lower than the other walls so that it can serve as an overflow for a mixture of phases supplied in a surplus. In this embodiment it may be desirable to supply the mixture of phases to all boxes or to a plurality thereof through adjustable inlet lines so that an optimum leading is selected for each box. In many cases, however, it is sufficient to feed the mixture of phases only to the uppermost box.

FIGS. 7 and 8 show a group of hoodlike boxes, which are also staggered like stairs in one or two horizontal directions.

These two figures can be derived from FIGS. 5 and 6 in the manner which has been described with reference to FIGS. 1 to 4. An additional modification resides in that the wall 4 on the inlet side is also lower and can serve as an overflow for the mixture of phases. In this case, an inlet line for the mixture of phases is provided only for the lowermost box. The remaining boxes receive a mixture of phases from the underflow of the preceding box.

Figure 10:
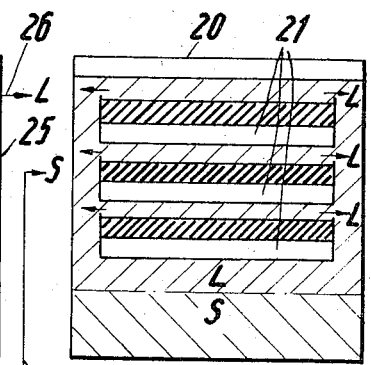
FIG. 10 is a corresponding vertical cross-sectional view taken on line E—E in FIG. 9.

FIGS. 9 and 10 show a separator, which is provided with installations according to the invention including open-topped tublike boxes disposed in the zone where the light phase is separated.

The boxes 21 are so arranged in the housing 20 that the walls of the inlet sides coincide with an end wall 22. Each box is provided with an inlet line 23 for a mixture of phases; that inlet opens through the end wall of the housing approximately on one-half of the height of the box and is adjusted by a valve or a diaphragm. The inlet lines 23 are fed from a supply line 24. The outlets 26 and 27 for the light and heavy phases, respectively, are provided at the opposite end 25. The outlet 27 for the pure heavy phase is designed like a siphon and adjustable in height so that the level of the interface 28 between the separated phases can be selected.

Figure 11:
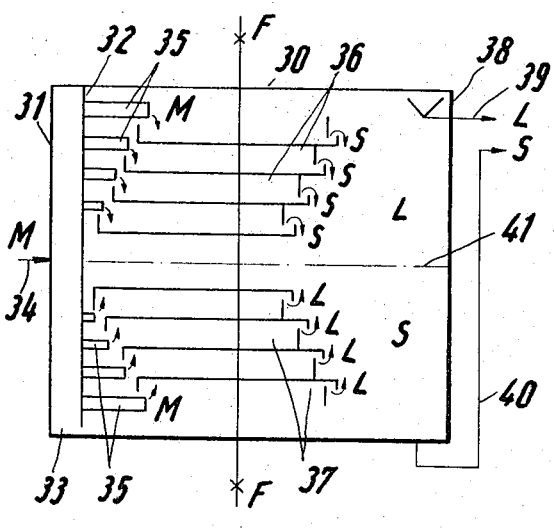
FIG. 11 is a vertical longitudinal sectional view showing another embodiment of a settler provided with installations according to the invention.
Figure 12:
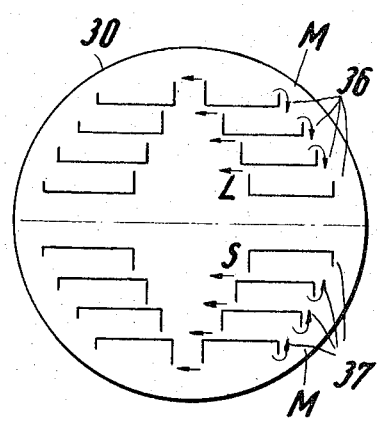
FIG. 12 is the corresponding vertical cross-sectional view taken on line F—F in FIG. 11.

In the embodiment shown in FIGS. 11 and 12, the settler has a cylindrical housing 30. Near the end wall 31, an inlet chamber 33 is defined by a partition 32 and is supplied with the mixture of phases to be separated by the conduit 34. From pipes 35 of controlled size inserted in said partition 32, the mixture of phases flows to the boxes 36 and 37 at a rate which corresponds to the optimum load per unit of area.

In the manner which has been described with reference to FIGS. 7 and 8, the boxes are relatively offset in two horizontal directions and the settler comprises tublike boxes 36 and hoodlike boxes 37. The outlets 39 and 40 for the pure light and heavy phases, respectively, are provided at the end 38. Just as in FIG. 9, the outlet 40 for the heavy phase is designed like a siphon and vertically adjustable so that the interface 41 forming between the pure phases can be adjusted to a level between the groups of boxes 36 and 37.

The invention will be explained more in detail with reference to an embodiment shown by way of example:

EXAMPLE

It is desired to extract copper with the aid of a solvent having ion-exchanging properties from an aqueous solution of copper sulfate.

The aqueous copper salt solution and the solvent are used in a volume ratio of 1:1. The throughput of the mixture of phases is 2,000 cubic meters per hour and each of the pure phases is recovered at a rate of about 1,000 cubic meters per hour.

If the phases are separated in a settler which is free of internal installations, the height of the settler could not substantially exceed 1 meter.

It is known that the maximum load of a settler per unit of area does not increase linearly with the thickness of the mixed phases but approaches a limit. The increase is larger in the range of smaller thicknesses of layers. A settler free of internal fixtures would require a bottom surface area of 360 square meters for the present operation.

If the settler is provided in accordance with the invention with ten boxes having a bottom surface area of 40 square meters each, the settler having an overall height of 4 meters will be required to have a bottom surface area of only 70 square meters.

If the settler is provided in known manner with horizontal or inclined plates, the height of the settler may be increased to 2–2.5 meters and the bottom surface area may be reduced to 180–260 square meters.

The invention enables the provision of a settler which is increased in height and has a smaller basis area. This is due to the fact that the mixture of phases to be separated is divided into a large number of layers disposed one over the other and having a thickness in that small range in which the rate of separation increases strongly with the thickness of the layer.

What is claimed is:

1. Phase separator for liquid-liquid extractors having a mixer and a settler which comprises a separator housing having inlet means for a mixture of liquid phases, outlet means for the separated pure light and heavy phases and internal means which promote the separation of said liquid phases consisting of a plurality of substantially horizontally extending, flat boxes, disposed one over the other, having an open top and closed bottom when positioned in the zone in which the light phase is separated and an open bottom and closed top when positioned in the zone in which the heavy phase is separated, each of said boxes having four sidewalls, one of said walls having inlet means for separately delivering to each box the mixture of phases to be separated, another of said walls being opposite said wall having inlet means and being spaced from the bottom of the open topped boxes and from the top of the open bottom boxes so as to define an edge of an outlet opening for separated pure phase, each of said outlet openings having a weir adjacent thereto for discharging separated pure phase into the surround zone in which the boxes are positioned, said wall defining the edge of said outlet opening extending vertically to the next adjacent box.

2. Phase separator of claim 1 wherein said boxes are relatively staggered in at least one substantially horizontal direction.

3. Phase Separator of claim 1 wherein said boxes are inclined in the direction of flow of the mixture of phases.

4. Phase separator of claim 1 wherein said boxes are laterally staggered relative to each other as regards the sidewalls provided with said outlet openings and an adjustable inlet line for a mixture of phases to be separated is connected to the sidewall opposite the outlet opening.

5. Phase separator of claim 1 wherein said boxes are relatively staggered and one sidewall is lower than the other sidewalls whereby surplus phase mixture flows over said lower sidewall to the next adjacent box.

6. Phase separator of claim 5 wherein the edge of said lower sidewall is provided with indentations extending over a part of the height of the sidewall.

7. Phase separator of claim 5 wherein said boxes are slightly inclined from the horizontal so that the edge of said lower wall is lower than the other sidewalls.

8. Phase separator of claim 1 wherein a plurality of group of boxes are staggered to form a cascade are provided in a settler housing.

9. Phase separator of claim 8 wherein at least one cascade-like group of open-bottomed boxes and at least one cascade-like group of open-topped boxes are provided in a settler housing.

* * * * *

UNITED STATES PATENT OFFICE
CERTIFICATE OF CORRECTION

Patent No. 3,868,335  Dated February 25, 1975

Inventor(s) Hans-Martin Stonner et al.

It is certified that error appears in the above-identified patent and that said Letters Patent are hereby corrected as shown below:

Inventor: line 3, "KNOPPE" should read -- KNORRE -- line 4, "WEISNER" should read -- WIESNER --.

Column 5, line 31, "leading" should read -- loading --.

Signed and Sealed this thirtieth Day of December 1975

[SEAL]

Attest:

RUTH C. MASON
*Attesting Officer*

C. MARSHALL DANN
*Commissioner of Patents and Trademarks*